US012612566B2

(12) United States Patent     (10) Patent No.: US 12,612,566 B2
Al-Aqeeli et al.     (45) Date of Patent: Apr. 28, 2026

(54) METHODS OF PROCESSING, TRANSPORTING, OR BOTH, OF HYDROGEN

(71) Applicant: Saudi Arabian Oil Company, Dhahran (SA)

(72) Inventors: Anas S. Al-Aqeeli, Dhahran (SA);
Raed H. Abudawoud, Dhahran (SA);
Faisal M. Almulla, Dhahran (SA);
Guanghui Zhu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 223 days.

(21) Appl. No.: 18/543,284

(22) Filed: Dec. 18, 2023

(65)     Prior Publication Data

US 2025/0197744 A1     Jun. 19, 2025

(51) Int. Cl.
*C10G 67/04*     (2006.01)
*C01B 3/00*     (2006.01)
*C01B 3/0015*     (2026.01)

(52) U.S. Cl.
CPC ........ *C10G 67/0436* (2013.01); *C01B 3/0015* (2013.01); *C01B 2203/0227* (2013.01);
(Continued)

(58) Field of Classification Search
CPC ........ C10G 67/0436; C10G 2300/1096; C10G 2300/301; C10G 2300/4006;
(Continued)

(56)     References Cited

U.S. PATENT DOCUMENTS

2011/0240518 A1* 10/2011 Podrebarac ............ C10G 65/04
208/59
2021/0269724 A1* 9/2021 Hodgkins .............. C10G 45/44
(Continued)

FOREIGN PATENT DOCUMENTS

EP     2960204 A1     12/2015
WO     2022074336 A1     4/2022

OTHER PUBLICATIONS

Notification of Transmittal of the International Search Report and Written Opinion of the International Searching Authority, or the Declaration dated Mar. 21, 2025 pertaining to International application No. PCT/US2024/060454 filed Dec. 17, 2024, pp. 1-13.
(Continued)

*Primary Examiner* — Randy Boyer
*Assistant Examiner* — Juan C Valencia
(74) *Attorney, Agent, or Firm* — DINSMORE & SHOHL LLP

(57)     ABSTRACT

Methods of transporting hydrogen may include, at a first hydrocarbon processing facility, hydrogenating a C9+ aromatic compounds-containing stream to form a saturated cyclic C9+ containing effluent stream; transporting the saturated cyclic C9+ containing effluent stream to a second hydrocarbon processing facility; and at the second hydrocarbon processing facility, and passing the saturated cyclic C9+ containing effluent stream and a hydrotreated heavy naphtha stream to a catalytic reformer to form a reformate stream; and separating a hydrogen gas product stream from the reformate stream. The first hydrocarbon processing facility and the second hydrocarbon processing facility may be separated by at least 100 km. The methods for processing hydrogen may include hydrotreating a heavy naphtha stream and passing a saturated cyclic C9+ containing effluent stream and the hydrotreated heavy naphtha stream to a catalytic reformer to form a reformate stream comprising (Continued)

hydrogen gas; and separating hydrogen gas from the reformate stream.

20 Claims, 3 Drawing Sheets

(52) U.S. Cl.
CPC .................. *C01B 2203/063* (2013.01); *C10G 2300/1096* (2013.01); *C10G 2300/301* (2013.01); *C10G 2300/4006* (2013.01); *C10G 2300/4012* (2013.01); *C10G 2300/4018* (2013.01); *C10G 2300/4062* (2013.01); *C10G 2400/30* (2013.01)

(58) Field of Classification Search
CPC .... C10G 2300/4012; C10G 2300/4018; C10G 2300/4062; C10G 2400/30; C10G 2300/42; C10G 35/00; C10G 63/02; C10G 69/08; C10G 45/44; C01B 3/0015; C01B 2203/0227; C01B 2203/063; C01B 2203/0277; C01B 3/24; C01B 2203/04; C01B 2203/065

See application file for complete search history.

(56) References Cited

U.S. PATENT DOCUMENTS

| | | | |
|---|---|---|---|
| 2023/0367300 A1* | 11/2023 | Kumar | .................. G06Q 50/06 |
| 2024/0166501 A1 | 5/2024 | Monguillon | |

OTHER PUBLICATIONS

Abdin, et al., "Large-scale stationary hydrogen storage via liquid organic hydrogen carriers", iScience, vol. 24, No. 102966, Sep. 24, 2021.

* cited by examiner

METHODS OF PROCESSING, TRANSPORTING, OR BOTH, OF HYDROGEN

TECHNICAL FIELD

Embodiments of the present disclosure generally relate to hydrogen processing, and more specifically, to methods and systems utilized in the transportation hydrogen.

BACKGROUND

Hydrogen is growing in importance as an environmentally friendly precursor chemical and fuel. Processes for the production and usage of hydrogen are relatively well developed. However, processes for the storage and transportation of hydrogen are still insufficient to meet the needs of the hydrogen industry. Generally, hydrogen is stored and transported in the form of compressed gaseous hydrogen molecules (e.g., at above 5,000 pounds per square inch). However, these conventional gaseous hydrogen transportation techniques are costly and inefficient. For example, the compression process consumes a large amount of energy (estimated to be 30% or more of the energy content of the hydrogen). Also, transport and storage of the compressed hydrogen requires expensive pressure vessels. Some of the hydrogen molecules can even escape through the walls of hydrogen containment vessels. The hydrogen can also cause embrittlement of the storage and transport vessels. Overall, better methods of hydrogen storage and transport are needed.

BRIEF SUMMARY

Embodiments of the present disclosure provide, according to one or more embodiments, methods of processing and/or transporting hydrogen that may utilize existing refinery equipment, such as hydrogenation units and/or catalytic reformers. By the methods described herein, C9+ aromatic compounds may be used as liquid organic hydrogen carriers ("LOHCs"), where they may be charged with hydrogen in a hydrogenation unit at a first hydrocarbon processing facility by saturation of the aromatic moieties. These saturated C9+ compounds may be transported to a second hydrocarbon processing facility, where hydrogen gas may be produced by dehydrogenation in a catalytic reformer. Generally, these saturated C9+ compounds are liquid, or are easier to liquefy than hydrogen, and thus easier to transport than hydrogen gas. Thus, hydrogen may be transported over vast distances, such as between countries or continents, without the need for new process equipment or costly hydrogen gas pressurization. Moreover, the catalytic reformer may be a catalytic reformer already utilized to reform hydrotreated heavy naphtha, reducing the need to purchase new process equipment.

According to one or more embodiments, a method for transporting hydrogen may comprise: at a first hydrocarbon processing facility, passing a C9+ aromatic compounds-containing stream and a first facility input hydrogen gas-containing stream to a hydrogenation unit to form a saturated cyclic C9+ containing effluent stream, wherein the saturated cyclic C9+ containing effluent stream comprises at least 50 wt. % saturated cyclic C9+ compounds; transporting the saturated cyclic C9+ containing effluent stream to a second hydrocarbon processing facility; and at the second hydrocarbon processing facility: passing at least a portion of a heavy naphtha stream and a second facility input hydrogen gas-containing stream to a hydrotreater to form a hydrotreated heavy naphtha stream, wherein the first hydrocarbon processing facility and the second hydrocarbon processing facility are separated by at least 100 km; passing the saturated cyclic C9+ containing effluent stream and the hydrotreated heavy naphtha stream to a catalytic reformer to form a reformate stream; and separating a hydrogen gas product stream from the reformate stream.

According to one or more embodiments, a method for processing hydrogen may comprise: passing a heavy naphtha stream and a hydrogen input stream to a hydrotreater to form a hydrotreated heavy naphtha stream, wherein the heavy naphtha stream has an initial boiling point of from 80° C. to 100° C. and a final boiling point of from 180° C. to 220° C.; passing a saturated cyclic C9+ containing effluent stream and the hydrotreated heavy naphtha stream to a catalytic reformer to form a reformate stream comprising hydrogen gas, wherein the saturated cyclic C9+ containing effluent stream comprises at least 50 wt. % saturated cyclic C9+ compounds; and separating hydrogen gas from the reformate stream.

These and other embodiments are described in more detail in the Detailed Description. It is to be understood that both the foregoing general description and the following detailed description present embodiments of the presently disclosed technology, and are intended to provide an overview or framework for understanding the nature and character of the technology as it is claimed. The accompanying drawings are included to provide a further understanding of the presently disclosed technology and are incorporated into and constitute a part of this specification. The drawings illustrate various embodiments and, together with the description, serve to explain the principles and operations of the presently disclosed technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
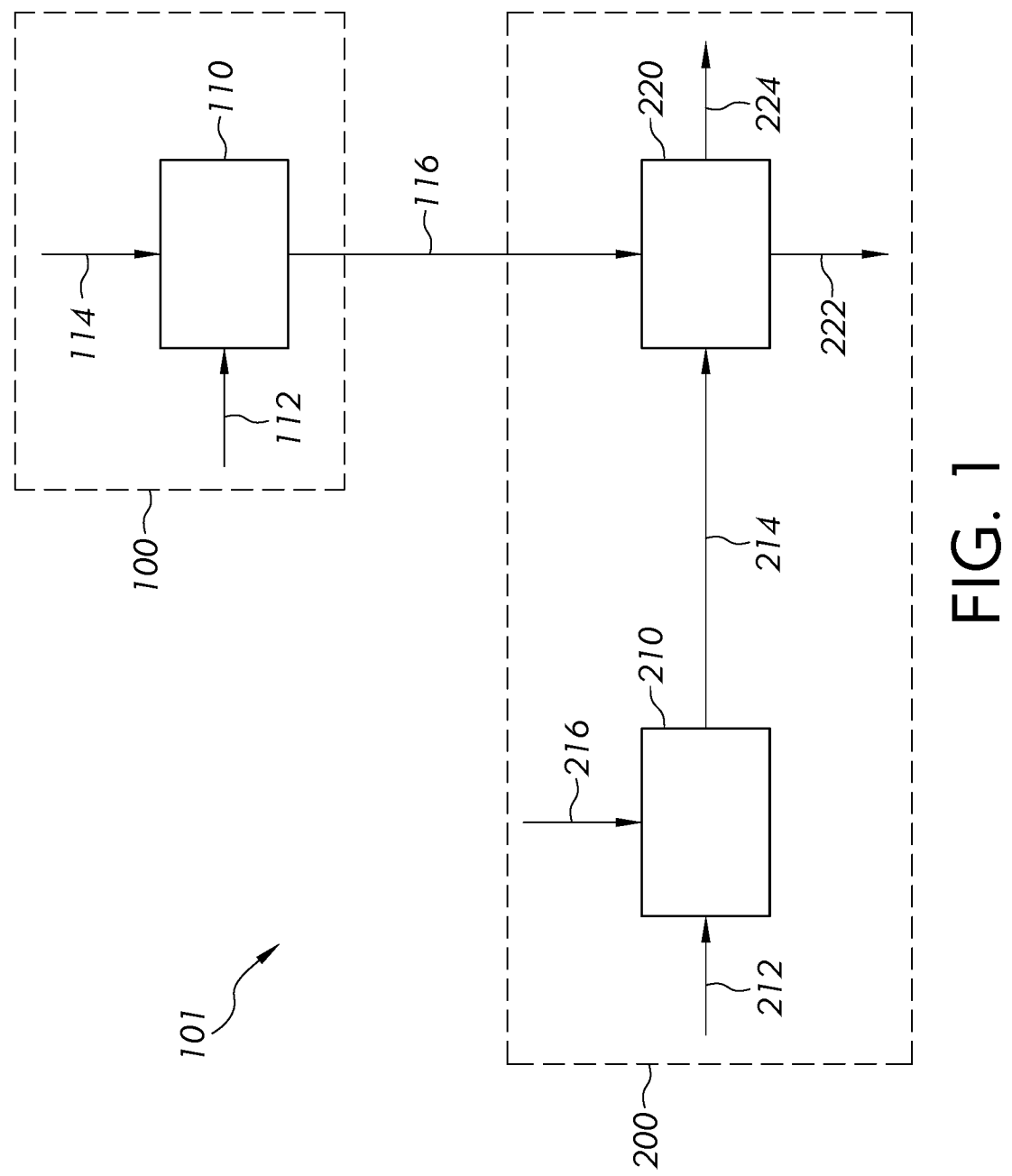
FIG. 1 schematically depicts a diagram of a system for transporting hydrogen, according to one or more embodiments described in this disclosure.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component. It should be understood that arrows in the relevant figures are not indicative of necessary or essential steps.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 2:
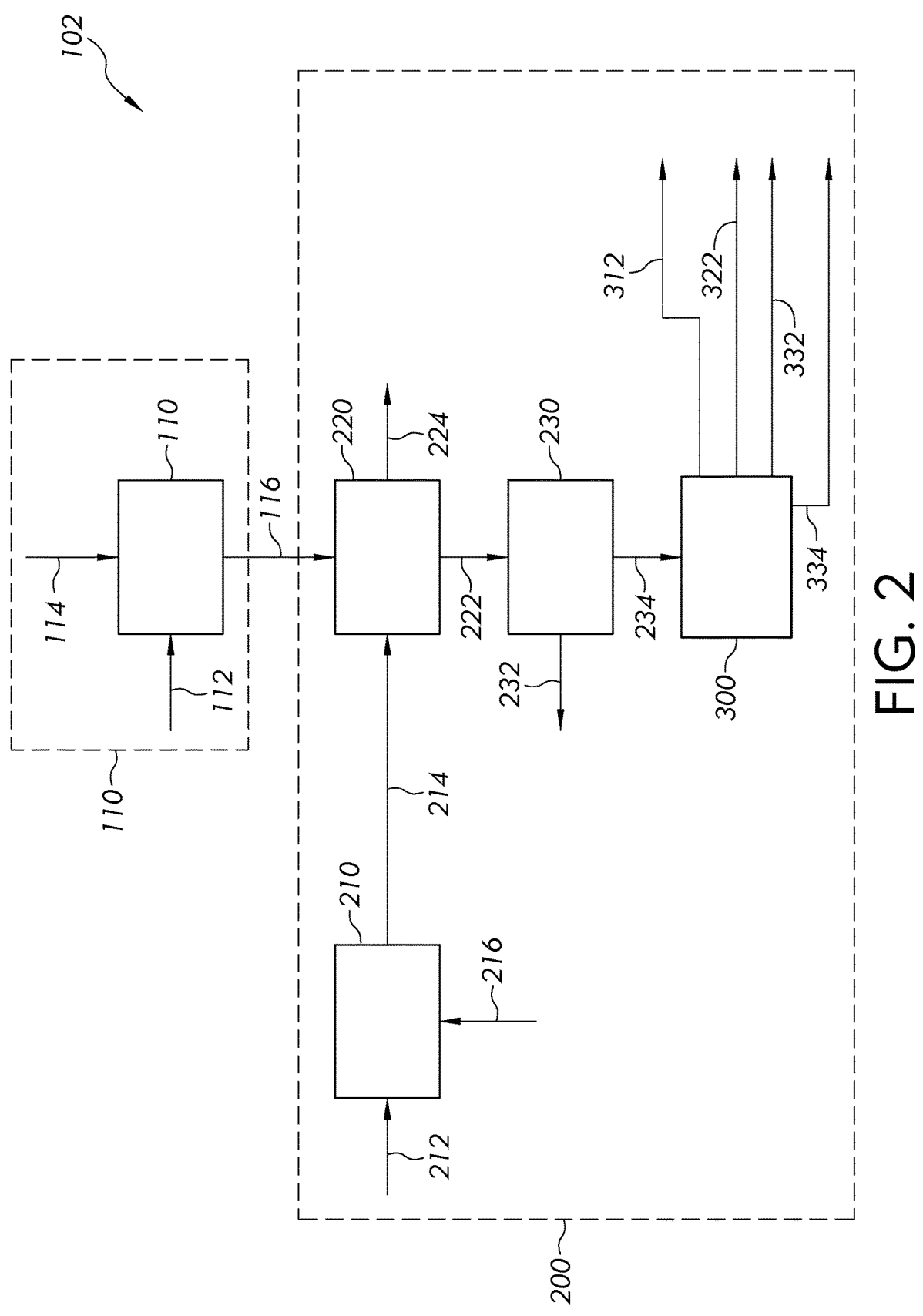
FIG. 2 schematically depicts a diagram of another system for transporting hydrogen, according to one or more embodiments described in this disclosure.
Figure 3:
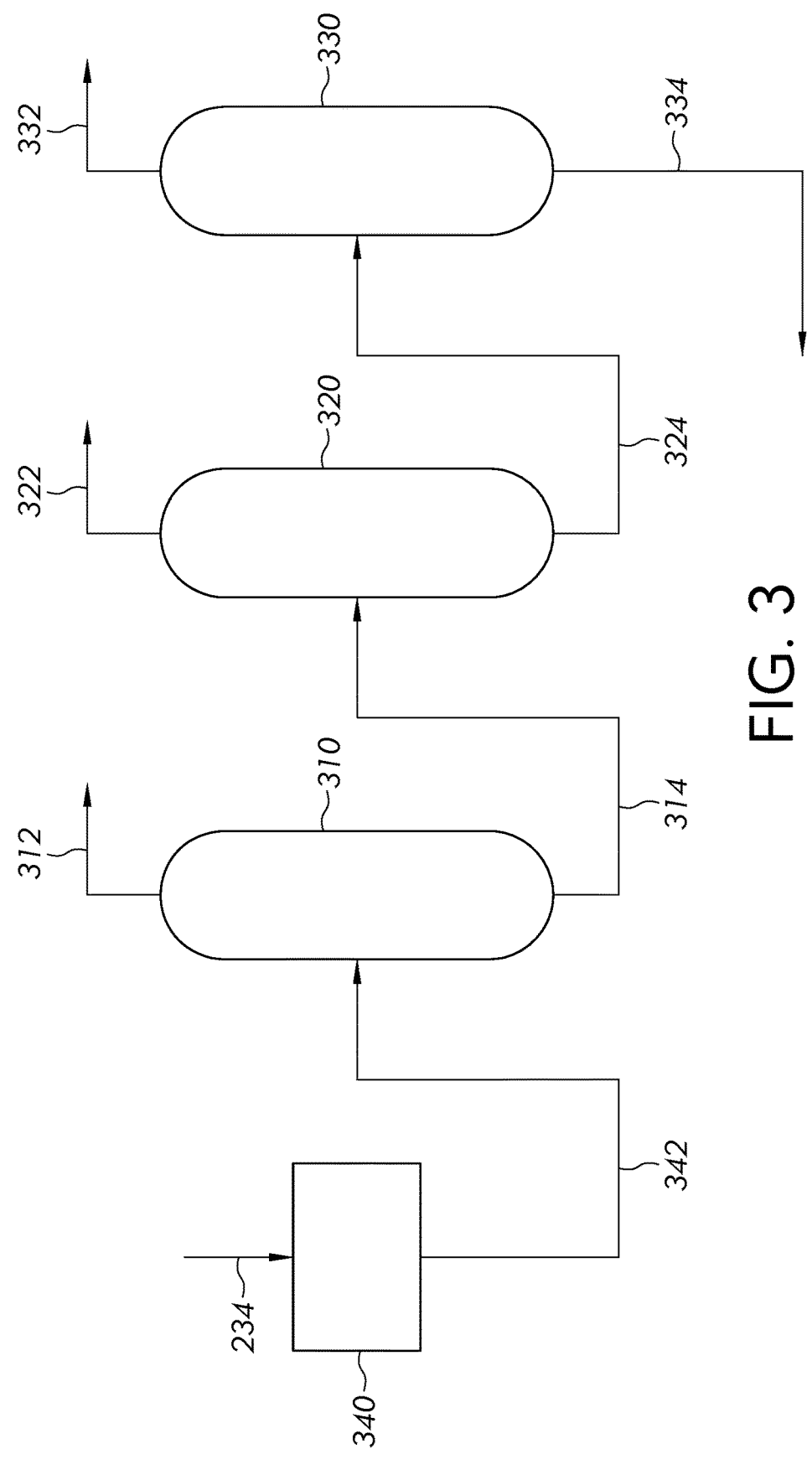
FIG. 3 schematically depicts a diagram of yet another system for transporting hydrogen, according to one or more embodiments described in this disclosure.

One or more embodiments of the present disclosure relate to methods for transporting hydrogen from one geographic region to another, or processing hydrogen such that it may be transported from one geographic region to another. In general, these methods are described herein in the context of one or more systems, shown in the drawings. The embodiments of FIGS. 1-3 are similar or identical in many ways, respectively, but include differences as described herein. Description of the embodiments of FIGS. 1-3 may generally apply to the embodiments of the other figures, as would be understood by those skilled in the art. For example, concepts disclosed herein applicable to FIG. 1 may be equally applicable to FIG. 2, and vice versa, even if not explicitly stated as such herein.

As described herein, a "hydrogenation unit" generally refers to a unit that may be within a refinery and designed to perform a hydrogenation reaction on a hydrocarbon feed. A hydrogenation reaction is a chemical reaction in which the number of hydrogen atoms in a compound is increased. Suitable hydrogenation units include, but are not limited to, hydrotreaters and hydrocrackers.

As described herein, a "hydrotreater" generally refers to a unit that may be within a refinery and designed to perform the hydrotreating process on a hydrocarbon feed. The hydrotreating process generally refers to the process of contacting a hydrocarbon feed with hydrogen and a hydrotreating catalyst at elevated temperature to remove or convert at least a portion of one or more impurities, such as sulfur, nitrogen, metals, and/or olefins. As described herein, a "naphtha hydrotreater" generally refers to a unit within a refinery designed to perform the hydrotreating process on naphtha fractions, such as heavy naphtha.

As used in this disclosure, a "catalyst" refers to any substance which increases the rate of a specific chemical reaction. Catalysts described in this disclosure may be utilized to promote various reactions, such as, but not limited to, hydrogenation reactions. As used in this disclosure, a "hydrogenation catalyst" increases the rate of a hydrogenation reaction, which may increase the number of hydrogen molecules in a compound. Such catalysts may have dual functionality in some embodiments. The methods described herein should not necessarily be limited by specific catalytic materials. As described herein, the catalysts may be fixed in configuration and utilize gaseous reactants. However, other configurations are contemplated.

As used in this disclosure, a "separation unit" refers to any separation device or system of separation devices that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation.

Now referring to FIG. 1, a system for transporting hydrogen 101 is depicted. The system for transporting hydrogen 101 may include at least a first hydrocarbon processing facility 100 and a second hydrocarbon processing facility 200, where the first hydrocarbon processing facility 100 and a second hydrocarbon processing facility 200 are in different geographic locations, such as separated by a distance of at least 100 km, as described herein. In general, a single hydrocarbon processing facility, such as the first hydrocarbon processing facility 100 and a second hydrocarbon processing facility 200, may be a processing facility that is only locally integrated with other processing facilities, and generally refers to an integrated complex capable of transforming its respective hydrocarbon feedstock into its respective products. For example, a single hydrocarbon processing facility may be under the control of a single entity, such as a company. In embodiments, each of the first hydrocarbon processing facility 100 and the second hydrocarbon processing facility 200 may independently be oil refineries. For example, the first hydrocarbon processing facility 100 and a second hydrocarbon processing facility 200 may be oil refineries, respectively, that are in different geographic regions, such as different states, countries, counties, provinces, continents, etc. Such oil refineries may process crude oil, or in other embodiments, may not presently process crude oil but may have been designed and/or built to process crude oil. In particular, and as described herein, the first hydrocarbon processing facility 100 and the second hydrocarbon processing facility 200 may each be oil refineries that include hydrotreaters and catalytic reformers, such as those utilized to process heavy naphtha cuts of crude oil in a refinery.

The first hydrocarbon processing facility 100 and the second hydrocarbon processing facility 200 may be separate from one another and in different geographic regions. For example, the first hydrocarbon processing facility 100 and the second hydrocarbon processing facility 200 may be at least 100 km apart from one another, such as at least 200 km apart from one another, at least 500 km apart from one another, or at least 1000 km apart from one another.

The physical distance between the first hydrocarbon processing facility 100 and the second hydrocarbon processing facility 200 may make conventional transportation of hydrogen gas between the first hydrocarbon processing facility 100 and the second hydrocarbon processing facility 200 difficult and/or costly. Use of the present methods and systems may allow for cheaper and/or more efficient transport of hydrogen between the first hydrocarbon processing facility 100 and the second hydrocarbon processing facility 200, thereby allowing an operator to take advantage of cheaper and/or renewable sources of electricity available near the first hydrocarbon processing facility 100 to form hydrogen gas. In some embodiments, the first hydrocarbon processing facility 100 and the second hydrocarbon processing facility 200 may be located at different latitudes, which may allow the operator to take advantage of variations in energy production, such as the increased production of electricity of a given solar panel when placed closer to the equator or change in seasonality.

Still referring to FIG. 1, the first hydrocarbon processing facility 100 may comprise at least a hydrogenation unit 110, and the second hydrocarbon processing facility 200 may comprise at least a hydrotreater 210 and a catalytic reformer 220. These system components and their various arrangements will be described in detail herein.

According to one or more embodiments, at the first hydrocarbon processing facility 100, a first facility input hydrogen gas-containing stream 112 and C9+ aromatic compounds-containing stream 114 may be passed to a hydrogenation unit 110. The first facility input hydrogen gas-containing stream 112 and C9+ aromatic compounds-containing stream 114 may be combined before being passed to the hydrogenation unit 110, or may be combined therein.

In some embodiments, the C9+ aromatic compounds-containing stream 114 may comprise C9+ aromatic compounds (i.e., aromatic compounds having at least 9 carbon atoms). The aromatic compounds of the C9+ aromatic compounds-containing stream 114 may be hydrocarbons. Suitable C9+ aromatic compounds may include, without limitation, benzyl toluene, dibenzyl toluene, methylindole, dimethylindole, phenazine, naphthalene, methylbenzyl pyridine, propylbenzene, methyl ethylbenzene, trimethylbenzene, butylbenzene, dimethyl ethylbenzene, and ethylcarbazole. For example, the C9+ aromatics may include two aromatic moieties linked to each other with an alkane bridge. In embodiments, the C9+ aromatic compounds-containing stream 114 may comprise at least 50 wt. %, such as at least 60 wt. %, at least 70 wt. %, at least 80 wt. %, at least 90 wt. %, at least 95 wt. %, at least 99 wt. %, or even at least 99.9 wt. % of the C9+ aromatic compounds, on the basis of the total weight of C9+ aromatic compounds-containing stream 114. The C9+ aromatic compounds-containing stream may be produced by catalytic reforming of naphtha to form a reformate and passing the reformate to an aromatics complex to form the C9+ aromatics compounds-containing stream (not shown in the figures).

In some embodiments, the first facility input hydrogen gas-containing stream 112 may comprise hydrogen gas. In embodiments, the C9+ aromatic compounds-containing stream 114 may comprise at least 80 wt. %, at least 90 wt. %, at least 95 wt. %, at least 99 wt. %, or at least 99.9 wt. % of hydrogen gas, on the basis of the total weight of C9+ aromatic compounds-containing stream 114.

According to some embodiments, the hydrogenation unit 110 may include a hydrogenation catalyst, where the hydrocarbons and other chemicals in the hydrogenation unit 110 may be contacted with a hydrogenation catalyst in the presence of hydrogen. In the hydrogenation unit 110, at least a portion of the aromatic compounds in the C9+ aromatic compounds-containing stream 114 may be hydrogenated and thus converted to cyclo-hexane moieties. For example, the C9+ aromatic compounds may be saturated in the hydrogenation unit 110. It is contemplated that the hydrogenation of the C9+ aromatic compounds may be by thermal hydrogenation, at the temperatures experienced in the hydrogenation unit 110, or the reaction may be catalytically enhanced by a hydrotreating catalyst or other catalyst specifically suited for hydrogenation.

In embodiments, the hydrogenation unit 110 may be a hydrotreater, such as a hydrotreater in a pre-existing oil refinery. The hydrogenation unit 110 may include a hydrogenation catalyst, where the hydrocarbons and other chemicals present in the hydrogenation unit 110 may be contacted with the hydrogenation catalyst in the presence of hydrogen. The hydrogenation catalyst may be a specialized hydrogenation catalyst or a hydrotreating catalyst, such as, cobalt-molybdenum (Co—Mo), nickel-molybdenum (Ni—Mo), nickel-tungsten (Ni—W), and/or noble metal catalysts. In embodiments, the catalyst may be supported by alumina. The hydrogenation unit 110 may be operated at a reaction temperature from 50° C. to 700° C., such as from 50° C. to 100° C., from 100° C. to 200° C., from 200° C. to 300° C., from 300° C. to 400° C., from 400° C. to 500° C., from 500° C. to 600° C., from 600 to 700° C., from 200° C. to 400° C., or any combination of these ranges. The hydrogenation unit 110 may be operated at a pressure of from 10 bar to 300 bar, such as from 10 bar to 250 bar, from 10 bar to 200 bar, from 10 bar to 150 bar, from 15 bar to 300 bar, from 15 bar to 200 bar, from 15 bar to 150 bar, or any subset thereof. The hydrogenation unit 110 may be operated at a liquid hourly space velocity ("LHSV") of from 0.5 $h^{-1}$ to 5 $h^{-1}$, such as from 0.5 $h^{-1}$ to 1 $h^{-1}$, from 1 $h^{-1}$ to 2 $h^{-1}$, from 2 $h^{-1}$ to 3 $h^{-1}$, from 3 $h^{-1}$ to $h^{-1}$, from 4 $h^{-1}$ to 5 $h^{-1}$, or any combination of these ranges.

Still referring to FIG. 1, the hydrogenation unit 110 may produce saturated cyclic C9+ containing effluent stream 116. The saturated cyclic C9+ containing effluent stream 116 may comprise C9+ cyclic hydrocarbons, containing cyclohexane moieties (the hydrogenated reaction products of the C9+ aromatic compounds-containing stream 114). The saturated cyclic C9+ effluent stream 116 may be a liquid at ambient temperature and pressure (i.e., 20° C. and 1 atmosphere), thus facilitating easy transport between the first hydrocarbon processing facility 100 and the second hydrocarbon processing facility 200. The saturated cyclic C9+ containing effluent stream 116 may have a greater ratio of hydrogen to carbon than the C9+ aromatic compounds-containing stream 114, that was subjected to hydrogenation in the hydrogenation unit 110. Thus, hydrogen atoms from the first facility input hydrogen gas-containing stream 112 are incorporated into the hydrocarbons in the saturated cyclic C9+ containing effluent stream 116 in the form of cyclo-hexane moieties. In embodiments, the saturated cyclic C9+ containing effluent stream 116 may comprise saturated, cyclic C9+ hydrocarbons. In embodiments, at least 60 wt. %, at least 70 wt. %, at least 80 wt. %, at least 90 wt. %, at least 95 wt. %, or even at least 99 wt. % of the hydrocarbons in the saturated cyclic C9+ containing effluent stream 116 may be saturated, cyclic hydrocarbons having at least 9 carbon molecules, on the basis of the total weight of saturated cyclic C9+ containing effluent stream 116.

According to one or more embodiments, the saturated cyclic C9+ containing effluent stream 116, or a portion thereof, may be transported from the first hydrocarbon processing facility 100 to the second hydrocarbon processing facility 200. Transporting the saturated cyclic C9+ containing effluent stream 116, or a portion thereof may transport hydrogen, in the form of hydrogen atoms covalently bonded to the hydrocarbons, from the first hydrocarbon processing facility 100 to the second hydrocarbon processing facility 200. Transporting may refer to the process of physically moving hydrocarbons, and to the process of preparing the hydrocarbons to be physically moved, from the first hydrocarbon processing facility 100 to the second hydrocarbon processing facility 200, and to the storage of hydrocarbons before, during, or after physical movement of the hydrocarbons. In embodiments, transporting the saturated cyclic C9+ containing effluent stream 116, or a portion thereof, may comprise transporting the saturated cyclic C9+ containing effluent stream 116, or a portion thereof, from the first hydrocarbon processing facility 100 to the second hydrocarbon processing facility 200 by tanker truck, train, ship, pipeline, or the like. In embodiments, the hydrocarbons may be transported from the first hydrocarbon processing facility 100 to the second hydrocarbon processing facility 200 by tanker truck, train, and/or ship. The transportation process may utilize pre-existing crude oil and petroleum products transportation infrastructure. In some embodiments, a time of at least 2 weeks, such as at least 1 month, at least 2 months, or at least 6 months, may pass between hydrogenating the C9+ aromatic compounds-containing stream 114 and dehydrogenating the saturated cyclic C9+ containing effluent stream 116. The transportation step may include storing the hydrocarbons at the first hydrocarbon processing facility 100, the second hydrocarbon processing facility 200, at an intermediate storage or processing facility, or in the transportation vessel itself. The temporal difference between the hydrogenating and dehydrogenating steps may allow the operator to store intermittent electricity in the form of hydrogen for use during times of higher demand, such as storing summer solar power for winter.

Still referring to FIG. 1, at the second hydrocarbon processing facility 200, a hydrotreated heavy naphtha stream 214 and the saturated cyclic C9+ containing effluent stream 116, or a portion thereof, which is transported, may be simultaneously reacted in the catalytic reformer 220 to produce the hydrogen product, thereby transporting hydrogen between hydrocarbon processing facilities.

The second hydrocarbon processing facility 200 may comprise at least a hydrotreater 210 and a catalytic reformer 220. These system components and their various arrangements will be described in more detail herein.

According to one or more embodiments, a heavy naphtha stream 212 and a second facility input hydrogen gas-containing stream 216 may be passed to the hydrotreater 210 to form hydrotreated heavy naphtha stream 214. The heavy naphtha stream 212 may refer to a hydrocarbon cut, such as a cut of a crude oil. The heavy naphtha stream 212 may have an initial boiling point ("IBP") of from 80° C. to 100° C., such as from 80° C. to 85° C., such as from 85° C. to 90° C., from 90° C. to 95° C., from 95° C. to 100° C., from 88° C. to 92° C., or any combination of these ranges. The heavy naphtha stream 212 may have a final boiling point ("FBP") of from 180° C. to 220° C., such as from 180° C. to 190° C., from 190° C. to 200° C., from 200° C. to 210° C., from 210° C. to 220° C., from 195° C. to 205° C., or combination of these ranges. The heavy naphtha stream 212 may comprise or consist of hydrocarbons. The second facility input hydrogen gas-containing stream 216 may comprise hydrogen gas. In embodiments, the second facility input hydrogen gas-containing stream 216 may comprise at least 80 wt. %, at least 90 wt. %, at least 95 wt. %, at least 99 wt. %, or at least 99.9 wt. % of hydrogen gas, on the basis of the total weight of the second facility input hydrogen gas-containing stream 216.

The hydrotreater 210 may hydrotreat the heavy naphtha stream 212. The hydrotreater 210 may be a naphtha hydrotreater. As described herein, a "naphtha hydrotreater" generally refers to a unit within a refinery designed to perform the hydrotreating process on naphtha fractions. In the hydrotreater 210, the hydrocarbons and other chemicals present in the hydrotreater 210 may be contacted with a hydrotreating catalyst in the presence of hydrogen. Contemplated hydrotreating catalysts include cobalt-molybdenum (Co—Mo), nickel-molybdenum (Ni—Mo), nickel-tungsten (Ni—W), and/or noble metal catalysts. In embodiments, the catalyst may be supported by alumina, amorphous aluminosilicates, and zeolites. The hydrotreater 210 may be operated at a reaction temperature from 50° C. to 100° C., from 100° C. to 200° C., from 200° C. to 300° C., from 300° C. to 400° C., from 400° C. to 500° C., from 500° C. to 600° C., from 600 to 700° C. or any combination of these ranges. The hydrotreater 210 may be operated at a pressure of from 10 bar to 300 bar, such as from 10 bar to 250 bar, from 10 bar to 200 bar, from 10 bar to 150 bar, from 15 bar to 300 bar, from 15 bar to 200 bar, from 15 bar to 150 bar, or any subset thereof. The hydrotreater 210 may be operated at a liquid hourly space velocity ("LHSV") of from 0.5 $h^{-1}$ to 5 $h^{-1}$, such as from 0.5 $h^{-1}$ to 1 $h^{-1}$, from 1 $h^{-1}$ to 2 $h^{-1}$, from 2 $h^{-1}$ to 3 $h^{-1}$, from 3 $h^{-1}$ to $h^{-1}$, from 4 $h^{-1}$ to 5 $h^{-1}$, or any combination of these ranges.

The hydrotreated heavy naphtha stream 214 may include the hydrotreated compounds initially in the heavy naphtha stream 212. The hydrotreated heavy naphtha stream 214 may have an initial boiling point ("IBP") of from 80° C. to 100° C., such as from 80° C. to 85° C., such as from 85° C. to 90° C., from 90° C. to 95° C., from 95° C. to 100° C., from 88° C. to 92° C., or any combination of these ranges. The hydrotreated heavy naphtha stream 214 may have a final boiling point ("FBP") of from 180° C. to 220° C., such as from 180° C. to 190° C., from 190° C. to 200° C., from 200° C. to 210° C., from 210° C. to 220° C., from 195° C. to 205° C., or combination of these ranges. The hydrotreated heavy naphtha stream 214 may comprise less than 1 wt. %, such as less than 0.5 wt. %, less than 0.1 wt. %, less than 0.01 wt. %, or even less than 0.001 wt. % of the combined weight of sulfur and nitrogen.

Still referring to FIG. 1, the hydrotreated heavy naphtha stream 214 and saturated cyclic C9+ containing effluent stream 116 may be passed to catalytic reformer 220 to form reformate stream 222 and hydrogen product stream 224. The catalytic reformer 220 may be operable to dehydrogenate the saturated cyclic C9+ containing effluent stream 116, thus releasing the hydrogen from the saturated cyclic C9+ containing effluent stream 116 and producing C9+ aromatic hydrocarbons. Catalytic reforming may refer to the process of converting linear hydrocarbons into branched alkanes and cyclic naphthenes, which are then partially dehydrogenated to produce aromatic hydrocarbons.

The catalytic reformer 220 may include a catalyst, where the hydrocarbons and other chemicals present in the catalytic reformer 220 may be contacted with the catalyst. The catalyst may be a catalyst that is compatible with catalytic processes that maximize production of aromatics. For instance, the catalyst can be a mono- or bi-functional metal catalyst, a halogen containing catalyst, a catalyst employing a zeolite such as zeolite L or a ZSM-5 zeolite, or another type of catalyst that can maximize aromatics production. Suitable metal catalysts may include, without limitation, one or more of platinum, palladium, rhenium, tin, gallium, bismuth, or other metal catalysts. The catalyst may be a supported catalyst, such as a catalyst comprising alumina, silica, or silica-alumina. The operating conditions of the catalytic reformer 220 may be selected to maximize aromatics production. The catalytic reformer 220 may operate at a pressure from 0.01 bar to 50 bar, such as from 0.1 bar to 1 bar, from 1 bar to 5 bar, from 5 bar to 10 bar, from 10 bar to 20 bar, from 20 bar to 30 bar, from 30 bar to 40 bar, from 40 bar to 50 bar, or any combination of these ranges. The molar ratio of hydrogen to hydrocarbon in the catalytic reformer 220 may be from 1:1 to 10:1, such as from 1:1 to 2:1, from 2:1 to 4:1, from 4:1 to 6:1, from 6:1 to 8:1, from 8:1 to 10:1, or any combination of these ranges. The catalytic reformer 220 may operate at a temperature of from 50° C. to 100° C., from 100° C. to 200° C., from 200° C. to 300° C., from 300° C. to 400° C., from 400° C. to 500° C., from 500° C. to 600° C., from 600 to 700° C., from 400° C. to 600° C., or any combination of these ranges. The catalytic reformer 220 may operate with a liquid hour space velocity of from 0.5 h$^{-1}$ to 5 h$^{-1}$, such as from 0.5 h$^{-1}$ to 1 h$^{-1}$, from 1 h$^{-1}$ to 2 h$^{-1}$, from 2 h$^{-1}$ to 3 h$^{-1}$, from 3 h$^{-1}$ to h$^{-1}$, from 4 h$^{-1}$ to 5 h$^{-1}$, or any combination of these ranges.

According to one or more embodiments, the reformate stream 222 may comprise benzene, toluene, xylene, C9+ aromatic compounds, and non-aromatic hydrocarbons.

According to one or more embodiments, hydrogen released from the hydrotreated heavy naphtha stream 214 and saturated cyclic C9+ containing effluent stream 116 in the catalytic reformer 220 may be separated from the reformate in the catalytic reformer 220 and thus form hydrogen product stream 224. In embodiments, hydrogen product stream 224 may be separated from the reformate to form the hydrogen product stream in a process step downstream of catalytic reformer 220, such as in a gas-liquid separation unit (not shown in FIG. 1). In embodiments, hydrogen product stream 224 may comprise hydrogen gas, such as at least 80 wt. %, at least 90 wt. %, at least 99 wt. %, at least 99.9 wt. %, at least 99.99 wt. %, or 99.999 wt. % of hydrogen gas, on the basis of the total weight of the hydrogen product stream 224. The hydrogen product stream 224 may comprise less than 500 parts per million by weight ("ppm"), less than 250 ppm, less than 100 ppm, less than 50 ppm, less than 20 ppm, or less than 10 ppm, less than 5 ppm, less than 2.5 ppm, or less than 1 ppm of each of sulfur and carbon monoxide. One practical and growing application for hydrogen gas is for use in fuel cells. Generally, low temperature fuel cells use precious metal catalysts which are susceptible to poisoning by sulfur and CO in their hydrogen fuels. Thus, it may be desirable for the hydrogen product stream 224 to contain relatively low amounts of sulfur and CO.

Referring now to FIG. 2, another system for transporting hydrogen 102 is depicted. The system for transporting hydrogen 102 may be similar or identical to the system for transporting hydrogen 101 of FIG. 1, except where described otherwise. In particular, the system for transporting hydrogen 102 may form benzene stream 312, toluene stream 322, mixed xylenes stream 332, and C9+ aromatic compounds product stream 334 from reformate stream 222, utilizing an aromatics complex 300 as described herein. As depicted in FIG. 2, the system for transporting hydrogen 102 may pass reformate stream 222 to extraction unit 230 to form non-aromatics-containing stream 232 and aromatics-containing stream 234.

In some embodiments, extraction unit 230 may be any separation unit or group of units capable of removing an aromatics-containing stream 234 from the reformate stream 222. The extraction unit 230 may also include a gas-liquid separation unit operable to remove the hydrogen product stream (shown in the figure as 224 leaving the catalytic reformer 220) from the reformate stream 222. In embodiments, the extraction unit 230 may comprise an extractive separation unit. In an extractive separation unit, a liquid-liquid extraction is performed to remove one or more compounds (such as aromatic compounds) from the bulk feedstock into a solvent. The solvent may then be separated in any suitable separation unit, such as, and without limitation, a series of flash vessels or a fractionator/distillation column that separates feedstock based on the boiling point, to remove the separated compounds.

The non-aromatics-containing stream 232 formed by extraction unit 230 may comprise the non-aromatic compounds originally in reformate stream 222. The non-aromatics-containing stream 232 formed by extraction unit 230, or portions thereof, may be recycled to hydrotreater 210, catalytic reformer 220, sold as product, burned, or used as feed to other processes. Aromatics-containing stream 234 may comprise aromatic hydrocarbons originally in reformate stream 222. In embodiments, aromatics-containing stream 234 may comprise at least 50 wt. %, at least 60 wt. %, at least 70 wt. %, at least 80 wt. %, at least 90 wt. %, at least 95 wt. %, or at least 99 wt. % of aromatic hydrocarbons, on the basis of the total weight of aromatics-containing stream 234.

Still referring to FIG. 2, aromatics-containing stream 234 may then be passed to aromatics complex 300 to form benzene stream 312, toluene stream 322, mixed xylenes stream 332, and C9+ aromatic compounds C9+ aromatic compounds product stream 334. In some embodiments, benzene stream 312, toluene stream 322, and mixed xylenes stream 332 may form a combined benzene-toluene-xylene ("BTX") stream (not shown in the figures). The aromatics complex 300 may be an aromatics complex in a pre-existing oil refinery.

In some embodiments, benzene stream 312 may comprise benzene. In embodiments, benzene stream 312 may comprise at least 80 wt. %, at least 90 wt. %, at least 95 wt. %, or at least 99 wt. % of benzene, on the basis of the total weight of benzene stream 312. In some embodiments, toluene stream 322 may comprise toluene. In embodiments, toluene stream 322 may comprise at least 80 wt. %, at least 90 wt. %, at least 95 wt. %, or at least 99 wt. % of toluene, on the basis of the total weight of toluene stream 322. In some embodiments, mixed xylenes stream 332 may comprise mixtures of xylenes. In embodiments, mixed xylenes stream 332 may comprise at least 80 wt. %, at least 90 wt. %, at least 95 wt. %, or at least 99 wt. % of xylenes, on the basis of the total weight of mixed xylenes stream 332. The C9+ aromatic compounds product stream 334 may comprise C9+ aromatic compounds, such as at least at least 80 wt. %, at least 90 wt. %, at least 95 wt. %, or at least 99 wt. % of C9+ aromatic compounds, on the basis of the total weight of the C9+ aromatic compounds product stream 334. The C9+ aromatic compounds product stream 334 may be transported back (not shown in the figure) to the first hydrocarbon processing facility 100 to form at least a portion of C9+ aromatic compounds-containing stream 114.

Referring now to FIG. 3, the aromatics complex 300 of FIG. 2 is depicted in greater detail. In the aromatics complex 300, aromatic compounds (or classes thereof), such as benzene, toluene, xylenes, and C9+ aromatic compounds may be separated from one another. In the aromatics complex 300, the aromatics-containing stream 234 may be passed to clay treater 340 to produce clay treated stream 342. The clay treater 340 may operate to purify the aromatics-containing stream 234. In embodiments, the clay treater 340 may function to remove at least non-aromatic olefin compounds from aromatics-containing stream 234 by reacting the non-aromatic olefin compounds by acid catalyzed alkylation. Generally, these non-aromatic olefin compounds may poison downstream units (such as p-xylene extraction units) or may reduce the purity of the product aromatics-containing streams (benzene stream 312, toluene stream 322, and mixed xylenes stream 332). The clay treater 340 may function by contacting the aromatics-containing stream 234 with a Lewis acid catalyst, such as an activated clay. The clay treater 340 may contact aromatics-containing stream 234 with the Lewis acid catalyst at temperatures of greater than 165° C., such as greater than 170° C., greater than 180° C., from 165° C. to 170° C., from 170° C. to 180° C., from 180° C. to 190° C., from 190° C. to 200° C., from 200° C. to 210° C., from 210° C. to 220° C., from 220° C. to 230° C., or any combination of these ranges.

In some embodiments, the clay treated stream 342 may comprise benzene, toluene, xylenes, and C9+ aromatic compounds. In embodiments, the clay treated stream 342 may have a lower concentration of benzene and higher concentrations of toluene and xylenes than aromatics-containing stream 234. In embodiments, the clay treated stream 342 may comprise at least 60 wt. %, at least 70 wt. %, at least 80 wt. %, at least 90 wt. %, at least 95 wt. %, or at least 99 wt. % of the combined weight of benzene, toluene, xylenes, and C9+ aromatic compounds, on the basis of the total weight of clay treated stream 342. In some embodiments, the clay treated stream 342 may comprise less than 5 wt. %, such as less than 2.5 wt. %, less than 1 wt. %, less than 0.5 wt. %, less than 0.25 wt. %, less than 0.1 wt. %, less than 0.01 wt. %, or even less than 0.001 wt. % of olefinic non-aromatic hydrocarbons, on the basis of the total weight of 342.

Still referring to FIG. 3, clay treated stream 342 may be passed to benzene extraction unit 310 to form benzene stream 312 and de-benzened stream 314. Benzene extraction unit 310 may be a process unit or group of process units capable of separating benzene from other aromatic hydrocarbons. In some embodiments, the benzene extraction unit 310 may be any suitable separation unit, such as, and without limitation, a flash vessel that separates feedstock based on the boiling point. In embodiments, de-benzened stream 314 may comprise toluene, xylene, and C9+ aromatic compounds. In embodiments, de-benzened stream 314 may comprise at least 80 wt. %, at least 90 wt. %, at least 95 wt. %, or at least 99 wt. % of the combined weight of toluene, xylenes, and C9+ aromatic compounds, on the basis of the total weight of de-benzened stream 314.

In embodiments, de-benzened stream 314 may be passed to toluene extraction unit 320 to form toluene stream 322 and de-toluened stream 324. Toluene extraction unit 320 may be a process unit or group of process units capable of separating toluene from other aromatic hydrocarbons. In some embodiments, the toluene extraction unit 320 may be any suitable separation unit, such as, and without limitation, a flash vessel that separates feedstock based on the boiling point. In embodiments, de-toluened stream 324 may comprise xylene, and C9+ aromatic compounds. In embodiments, de-toluened stream 324 may comprise at least 80 wt. %, at least 90 wt. %, at least 95 wt. %, or at least 99 wt. % of the combined weight of xylenes and C9+ aromatic compounds, on the basis of the total weight of de-toluened stream 324.

De-toluened stream 324 may be passed to xylene extraction unit 330 to form mixed xylenes stream 332 and C9+ aromatic compounds product stream 334. Xylene extraction unit 330 may be a process unit or group of process units capable of separating xylene from other aromatic hydrocarbons. In some embodiments, the xylene extraction unit 330 may be any suitable separation unit, such as, and without limitation, a flash vessel that separates feedstock based on the boiling point.

Referring again to FIGS. 1 and 2, as mentioned previously, in some embodiments, the first facility input hydrogen gas-containing stream 112 may comprise hydrogen produced from hydrocarbons, hydrogen produced from renewable sources (e.g., hydrogen produced from water electrolysis using electricity produced from sources other than the combustion of hydrocarbons), or both. In some embodiments, the first facility input hydrogen gas-containing stream 112 may be a combination of both hydrogen produced from hydrocarbons and hydrogen produced from renewable sources. For example, the electricity for the electrolysis process may be produced from solar power, wind power, geothermal power, or hydroelectric power. In some embodiments, where both renewable hydrogen and hydrogen produced from hydrocarbons are present, the amount of renewable hydrogen introduced to the hydrogenation unit 110 may be greater than or equal to the amount of hydrogen released through the dehydrogenation reactions, per ton of hydrocarbon feed. For example, if the total hydrogen released through the dehydrogenation reactions is 1 kg hydrogen/10 kg hydrocarbon feed, then at least 1 kg of renewable hydrogen per 10 kg hydrocarbon feed may be introduced to the hydrogenation unit 110. In embodiments, at least 10 wt. % of the hydrogen introduced to the hydrogenation unit 110 may be produced from the combustion of hydrocarbons. Generally, when the of amount of renewable hydrogen introduced to the hydrogenation unit 110 is greater than or equal to the amount of hydrogen released through the dehydrogenation reactions, it may be possible for sellers to market the hydrogen released through the dehydrogenation reactions as "renewable" hydrogen, increasing the value of the hydrogen released, as renewable hydrogen. However, renewable hydrogen may be more expensive than hydrogen produced from hydrocarbons, and thus it may be desirable to minimize the amount of renewable hydrogen utilized. The use of a combination of hydrogen produced from hydrocarbons and hydrogen produced from renewable sources may enable to sellers to market the hydrogen released as "renewable" hydrogen while still utilizing at least some of the generally less expensive hydrogen produced from hydrocarbons.

Numerous aspects are included in the present disclosure, including aspects 1-20.

Aspect 1. A method for transporting hydrogen, the method comprising: at a first hydrocarbon processing facility, passing a C9+ aromatic compounds-containing stream and a first facility input hydrogen gas-containing stream to a hydrogenation unit to form a saturated cyclic C9+ containing effluent stream, wherein the saturated cyclic C9+ containing effluent stream comprises at least 50 wt. % saturated cyclic C9+ compounds; transporting the saturated cyclic C9+ containing effluent stream to a second hydrocarbon processing facility; and at the second hydrocarbon processing facility: passing at least a portion of a heavy naphtha stream and a second facility input hydrogen gas-containing stream to a hydrotreater to form a hydrotreated heavy naphtha stream, wherein the first hydrocarbon processing facility and the second hydrocarbon processing facility are separated by at least 100 km; passing the saturated cyclic C9+ containing effluent stream and the hydrotreated heavy naphtha stream to a catalytic reformer to form a reformate stream; and separating a hydrogen gas product stream from the reformate stream.

Aspect 2. The method of aspect 1, wherein the C9+ aromatic compounds-containing stream is produced by an aromatics complex at the first hydrocarbon processing facility.

Aspect 3. The method of any one of aspects 1-2, wherein separating a hydrogen gas product stream from the reformate stream comprises: passing the reformate stream to an extraction unit to form a non-aromatics-containing stream, an aromatics-containing stream, and the hydrogen gas product stream; and passing the aromatics-containing stream to an aromatics complex to form at least a benzene stream, a toluene stream, a mixed xylenes stream, and a C9+ aromatic compounds product stream.

Aspect 4. The method of aspect 3, wherein passing the aromatics-containing stream to the aromatics complex to form at least the benzene stream, the toluene stream, the mixed xylenes stream, and the C9+ aromatic compounds product stream comprises: passing the aromatics-containing stream to a clay treater to form a clay treated stream; passing the clay treated stream to a benzene extraction unit to form a de-benzened stream and the benzene stream; passing the de-benzened stream to a toluene extraction unit to form a de-toluened stream and the toluene stream; and passing the de-toluened stream to a xylene extraction unit to form the C9+ aromatic compounds product stream and the mixed xylenes stream.

Aspect 5. The method of any one of aspects 1-4, wherein transporting the saturated cyclic C9+ containing effluent stream comprises moving the saturated cyclic C9+ containing effluent stream by truck, train, and/or ship.

Aspect 6. The method of any one of aspects 1-5, wherein the heavy naphtha stream has an initial boiling point of from 80° C. to 100° C. and a final boiling point of from 180° C. to 220° C.

Aspect 7. The method of aspect 6, wherein the heavy naphtha stream has an initial boiling point of from 88° C. to 92° C. and a final boiling point of from 195° C. to 205° C.

Aspect 8. The method of any one of aspects 1-7, wherein the second hydrocarbon processing facility is an oil refinery.

Aspect 9. The method of any one of aspects 1-8, wherein the hydrogenation unit is a hydrotreater operated at a reaction temperature of from 50° C. to 700° C., a pressure of from 10 bar to 300 bar, and a liquid hourly space velocity of from 0.5 h$^{-1}$ to 5 h$^{-1}$.

Aspect 10. The method of any one of aspects 1-9, wherein the catalytic reformer is operated at a reaction temperature from 50° C. to 700° C., a pressure from 0.01 to 50 bar, and a liquid hourly space velocity of from 0.5 h$^{-1}$ to 5 h$^{-1}$.

Aspect 11. A method for processing hydrogen, the method comprising: passing a heavy naphtha stream and a hydrogen input stream to a hydrotreater to form a hydrotreated heavy naphtha stream, wherein the heavy naphtha stream has an initial boiling point of from 80° C. to 100° C. and a final boiling point of from 180° C. to 220° C.; passing a saturated cyclic C9+ containing effluent stream and the hydrotreated heavy naphtha stream to a catalytic reformer to form a reformate stream comprising hydrogen gas, wherein the saturated cyclic C9+ containing effluent stream comprises at least 50 wt. % saturated cyclic C9+ compounds; and separating hydrogen gas from the reformate stream.

Aspect 12. The method of aspect 11, wherein the hydrotreater and the catalytic reformer are positioned within a second hydrocarbon processing facility, the method further comprising: at a first hydrocarbon processing facility, passing a C9+ aromatic compounds-containing stream and a first facility input hydrogen gas-containing stream to a hydrogenation unit to form the saturated cyclic C9+ containing effluent stream; and transporting the saturated cyclic C9+ containing effluent stream to the second hydrocarbon processing facility, wherein the first hydrocarbon processing facility and the second hydrocarbon processing facility are separated by at least 100 km.

Aspect 13. The method of aspect 12, wherein the second hydrocarbon processing facility is an oil refinery.

Aspect 14. The method of any one of aspects 11-13, wherein the hydrotreater is operated at a reaction temperature of from 50° C. to 700° C., a pressure of from 15 bar to 150 bar, a pressure of from 10 bar to 300 bar, and a liquid hourly space velocity of from 0.5 h$^{-1}$ to 5 h$^{-1}$.

Aspect 15. The method of any one of aspects 11-14, wherein the catalytic reformer is operated at a reaction temperature from 50° C. to 700° C., a pressure from 0.01 to 50 bar, and a liquid hourly space velocity of from 0.5 h$^{-1}$ to 5 h$^{-1}$.

Aspect 16. The method of any one of aspects 11-15, wherein the heavy naphtha stream has an initial boiling point of from 88° C. to 92° C. and a final boiling point of from 195° C. to 205° C.

Aspect 17. The method of any one of aspects 11-16, wherein separating a hydrogen gas product stream from the reformate stream comprises: passing the reformate stream to an extraction unit to form a non-aromatics-containing stream, an aromatics-containing stream, and the hydrogen gas product stream; and passing the aromatics-containing stream to an aromatics complex to form a benzene stream, a toluene stream, a mixed xylenes stream, and a C9+ aromatic compounds product stream.

Aspect 18. The method of aspect 17, wherein passing the aromatics-containing stream to the aromatics complex to form at least the benzene stream, the toluene stream, the mixed xylenes stream, and the C9+ aromatic compounds product stream comprises: passing the aromatics-containing stream to a clay treater to form a clay treated stream; passing the clay treated stream to a benzene extraction unit to form a de-benzened stream and the benzene stream; passing the de-benzened stream to a toluene extraction unit to form a de-toluened stream and the toluene stream; and passing the de-toluened stream to a xylene extraction unit to form the C9+ aromatic compounds product stream and the mixed xylenes stream.

Aspect 19. The method of aspect 18, further comprising transporting the C9+ aromatic compounds product stream to the first hydrocarbon processing facility such that the C9+ aromatic compounds product stream is passed to the hydrogenation unit as at least part of the C9+ aromatics compounds-containing stream.

Aspect 20. The method of any one of aspects 12-19, wherein the hydrogenation unit is a hydrotreater operated at a reaction temperature of from 50° C. to 700° C., a pressure of from 10 bar to 300 bar, and a liquid hourly space velocity of from 0.5 h$^{-1}$ to 5 h$^{-1}$.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrotreated effluent stream" passing from a first system component to a second system component should be understood to equivalently disclose "propylene" passing from a first system component to a second system component, and the like.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It is also noted that recitations herein of "at least one" component, element, etc., should not be used to create an inference that the alternative use of the articles "a" or "an" should be limited to a single component, element, etc.

What is claimed is:

1. A method for transporting hydrogen, the method comprising:

at a first hydrocarbon processing facility, passing a C9+ aromatic compounds-containing stream and a first facility input hydrogen gas-containing stream to a hydrogenation unit to form a saturated cyclic C9+ containing effluent stream, wherein the saturated cyclic C9+ containing effluent stream comprises at least 50 wt. % saturated cyclic C9+ compounds;

transporting the saturated cyclic C9+ containing effluent stream to a second hydrocarbon processing facility; and at the second hydrocarbon processing facility:

passing at least a portion of a heavy naphtha stream and a second facility input hydrogen gas-containing stream to a hydrotreater to form a hydrotreated heavy naphtha stream, wherein the first hydrocarbon processing facility and the second hydrocarbon processing facility are separated by at least 100 km;

passing the saturated cyclic C9+ containing effluent stream and the hydrotreated heavy naphtha stream to a catalytic reformer to form a reformate stream; and separating a hydrogen gas product stream from the reformate stream.

2. The method of claim 1, wherein the C9+ aromatic compounds-containing stream is produced by an aromatics complex at the first hydrocarbon processing facility.

3. The method of claim 1, wherein separating a hydrogen gas product stream from the reformate stream comprises: passing the reformate stream to an extraction unit to form a non-aromatics-containing stream, an aromatics-containing stream, and the hydrogen gas product stream; and passing the aromatics-containing stream to an aromatics complex to form at least a benzene stream, a toluene stream, a mixed xylenes stream, and a C9+ aromatic compounds product stream.

4. The method of claim 3, wherein passing the aromatics-containing stream to the aromatics complex to form at least the benzene stream, the toluene stream, the mixed xylenes stream, and the C9+ aromatic compounds product stream comprises:

passing the aromatics-containing stream to a clay treater to form a clay treated stream;

passing the clay treated stream to a benzene extraction unit to form a de-benzened stream and the benzene stream;

passing the de-benzened stream to a toluene extraction unit to form a de-toluened stream and the toluene stream; and passing the de-toluened stream to a xylene extraction unit to form the C9+ aromatic compounds product stream and the mixed xylenes stream.

5. The method of claim 1, wherein transporting the saturated cyclic C9+ containing effluent stream comprises moving the saturated cyclic C9+ containing effluent stream by truck, train, and/or ship.

6. The method of claim 1, wherein the heavy naphtha stream has an initial boiling point of from 80° C. to 100° C. and a final boiling point of from 180° C. to 220° C.

7. The method of claim 6, wherein the heavy naphtha stream has an initial boiling point of from 88° C. to 92° C. and a final boiling point of from 195° C. to 205° C.

8. The method of claim 1, wherein the second hydrocarbon processing facility is an oil refinery.

9. The method of claim 1, wherein the hydrogenation unit is a hydrotreater operated at a reaction temperature of from 50° C. to 700° C., a pressure of from 10 bar to 300 bar, and a liquid hourly space velocity of from 0.5 h$^{-1}$ to 5 h$^{-1}$.

10. The method of claim 1, wherein the catalytic reformer is operated at a reaction temperature from 50° C. to 700° C., a pressure from 0.01 to 50 bar, and a liquid hourly space velocity of from 0.5 h$^{-1}$ to 5 h$^{-1}$.

11. A method for processing hydrogen, the method comprising:

passing a heavy naphtha stream and a hydrogen input stream to a hydrotreater to form a hydrotreated heavy naphtha stream, wherein the heavy naphtha stream has an initial boiling point of from 80° C. to 100° C. and a final boiling point of from 180° C. to 220° C.;

passing a saturated cyclic C9+ containing effluent stream and the hydrotreated heavy naphtha stream to a catalytic reformer to form a reformate stream comprising hydrogen gas, wherein the saturated cyclic C9+ containing effluent stream comprises at least 50 wt. % saturated cyclic C9+ compounds; and separating hydrogen gas from the reformate stream.

12. The method of claim 11, wherein the hydrotreater and the catalytic reformer are positioned within a second hydrocarbon processing facility, the method further comprising:

at a first hydrocarbon processing facility, passing a C9+ aromatic compounds-containing stream and a first facility input hydrogen gas-containing stream to a hydrogenation unit to form the saturated cyclic C9+ containing effluent stream; and transporting the saturated cyclic C9+ containing effluent stream to the second hydrocarbon processing facility, wherein the first hydrocarbon processing facility and the second hydrocarbon processing facility are separated by at least 100 km.

13. The method of claim 12, wherein the second hydrocarbon processing facility is an oil refinery.

14. The method of claim 11, wherein the hydrotreater is operated at a reaction temperature of from 50° C. to 700° C., a pressure of from 10 bar to 300 bar, and a liquid hourly space velocity of from 0.5 h$^{-1}$ to 5 h$^{-1}$.

15. The method of claim 11, wherein the catalytic reformer is operated at a reaction temperature from 50° C. to 700° C., a pressure from 0.01 to 50 bar, and a liquid hourly space velocity of from 0.5 h$^{-1}$ to 5 h$^{-1}$.

16. The method of claim 11, wherein the heavy naphtha stream has an initial boiling point of from 88° C. to 92° C. and a final boiling point of from 195° C. to 205° C.

17. The method of claim 11, wherein separating a hydrogen gas product stream from the reformate stream comprises:

passing the reformate stream to an extraction unit to form a non-aromatics-containing stream, an aromatics-containing stream, and the hydrogen gas product stream; and passing the aromatics-containing stream to an aromatics complex to form a benzene stream, a toluene stream, a mixed xylenes stream, and a C9+ aromatic compounds product stream.

18. The method of claim 17, wherein passing the aromatics-containing stream to the aromatics complex to form at least the benzene stream, the toluene stream, the mixed xylenes stream, and the C9+ aromatic compounds product stream comprises:

passing the aromatics-containing stream to a clay treater to form a clay treated stream;

passing the clay treated stream to a benzene extraction unit to form a de-benzened stream and the benzene stream;

passing the de-benzened stream to a toluene extraction unit to form a de-toluened stream and the toluene stream; and passing the de-toluened stream to a xylene extraction unit to form the C9+ aromatic compounds product stream and the mixed xylenes stream.

19. The method of claim 18, further comprising transporting the C9+ aromatic compounds product stream to the first hydrocarbon processing facility such that the C9+ aromatic compounds product stream is passed to the hydrogenation unit as at least part of the C9+ aromatics compounds-containing stream.

20. The method of claim 12, wherein the hydrogenation unit is a hydrotreater operated at a reaction temperature of from 50° C. to 700° C., a pressure of from 10 bar to 300 bar, and a liquid hourly space velocity of from 0.5 h$^{-1}$ to 5 h$^{-1}$.

* * * * *